(12) United States Patent
Cibin et al.

(10) Patent No.: US 6,199,246 B1
(45) Date of Patent: Mar. 13, 2001

(54) INTEGRATED TIE FOR FASTENING THE UPHOLSTERY OF A VEHICLE SEAT CUSHION AND/OR SEATBACK, AND RELATIVE FABRICATION METHOD

(75) Inventors: Silvano Cibin, Leini'; Manrico Oddenino, Buttigliera Alta, both of (IT)

(73) Assignee: ITW Fastex-Italia S.p.A. (IT)

( * ) Notice: Subject to any disclaimer, the term of this patent is extended or adjusted under 35 U.S.C. 154(b) by 0 days.

(21) Appl. No.: 09/157,586

(22) Filed: Sep. 21, 1998

(51) Int. Cl.[7] .................................................. A44B 21/00
(52) U.S. Cl. ................................................................ 24/298
(58) Field of Search ............................... 24/298, 300–302, 24/16 R, 16 PB; 156/70, 93, 218, 380.1

(56) References Cited

U.S. PATENT DOCUMENTS

| | | | |
|---|---|---|---|
| 1,778,955 | * | 10/1930 | Morrill . |
| 3,548,906 | * | 12/1970 | Murphy . |
| 4,391,063 | * | 7/1983 | Gill, III . |
| 4,769,875 | * | 9/1988 | Hartman . |
| 5,619,776 | | 4/1997 | Oddenino . |
| 5,890,381 | * | 4/1999 | Leeke et al. . |

* cited by examiner

*Primary Examiner*—James R. Brittain
(74) *Attorney, Agent, or Firm*—Schwartz & Weinrieb

(57) ABSTRACT

A tie for fastening the upholstery of a vehicle seat cushion and/or seatback; the tie including a portion of wire, of predetermined length, fitted integrally at opposite ends with respective mutually connectable end heads, and a portion of tape shorter than the portion of wire and folded longitudinally about the portion of wire, between the heads, to enclose the portion of wire inside a tubular sleeve defined by a U-folded intermediate longitudinal portion of the portion of tape and closed by a flat connecting strip defined by superimposed mutually fixed opposite longitudinal lateral portions of the portion of tape; the connecting strip being stitchable to the upholstery in a conventional manner. The heads are molded, adjacent to and oriented head-to-tail with respect to each other, onto a first portion of wire held taut between the half-molds of an injection press; the wire is drawn and curved 90° to unwind, between the half-molds, a second portion of wire from a reel; and, while one head is gripped so as to maintain the second portion of wire taut, the other head is gripped by a supporting device, which cuts the wire between the adjacent heads, and keeps the first portion of wire taut while rotating it onto a precut portion of tape parallel to an assembly surface, with respect to which the edges of the portion of tape are raised and welded to each other so as to form the tubular sleeve about the portion of wire.

20 Claims, 3 Drawing Sheets

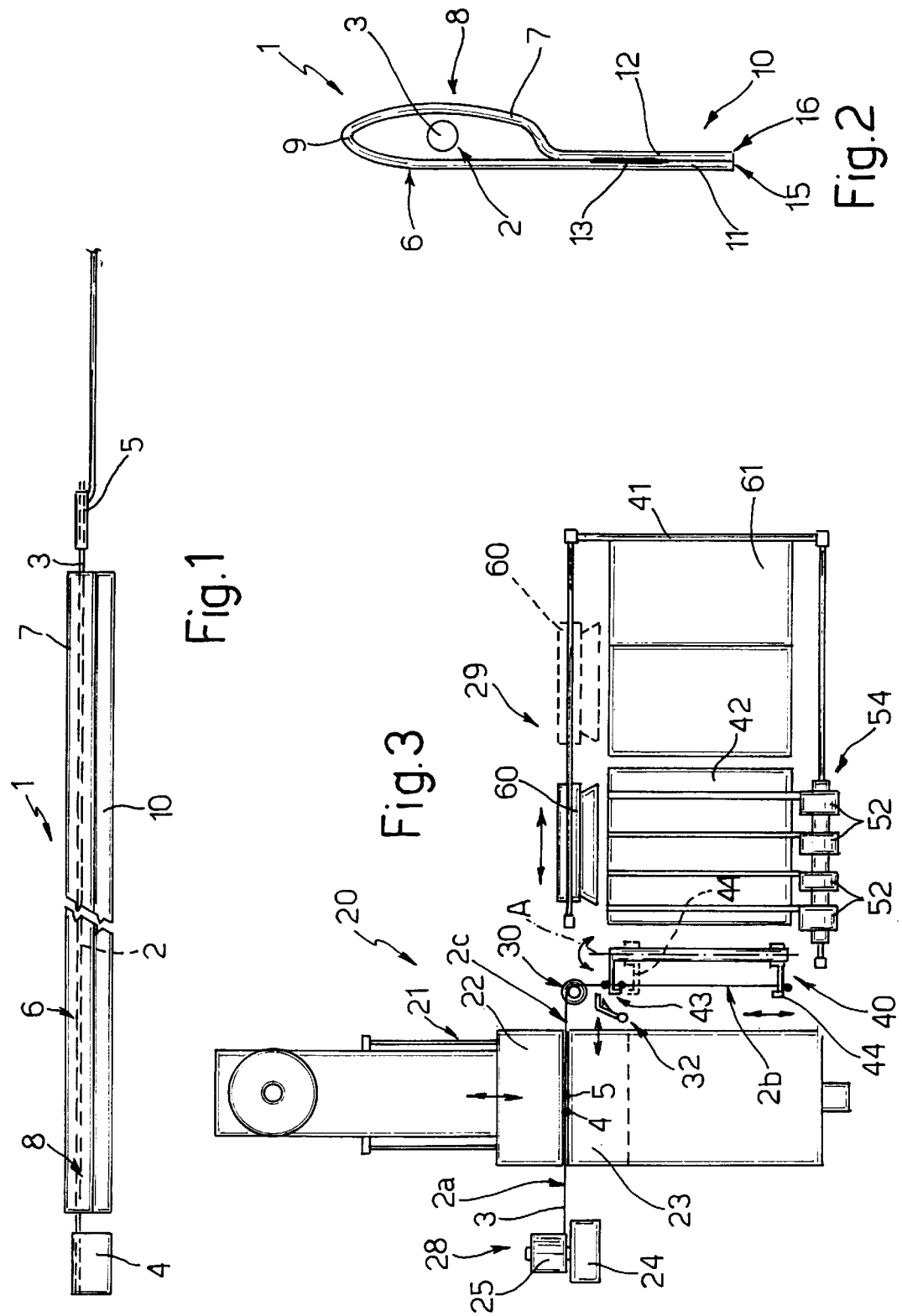

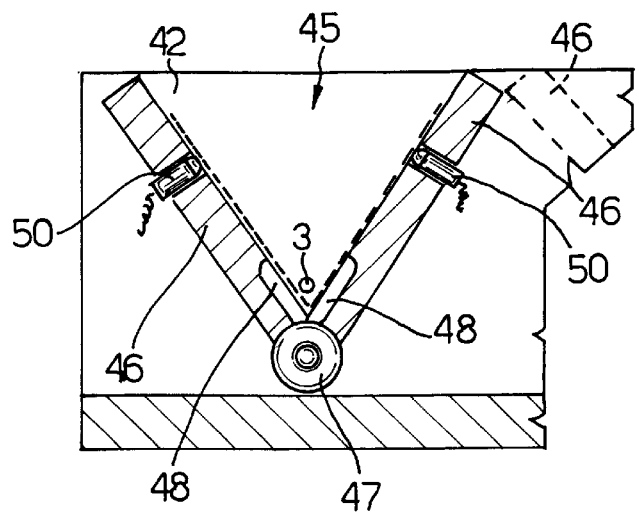
Fig. 6
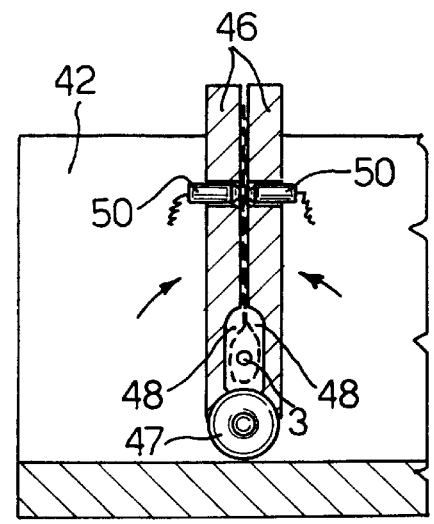
Fig. 7
Fig. 8
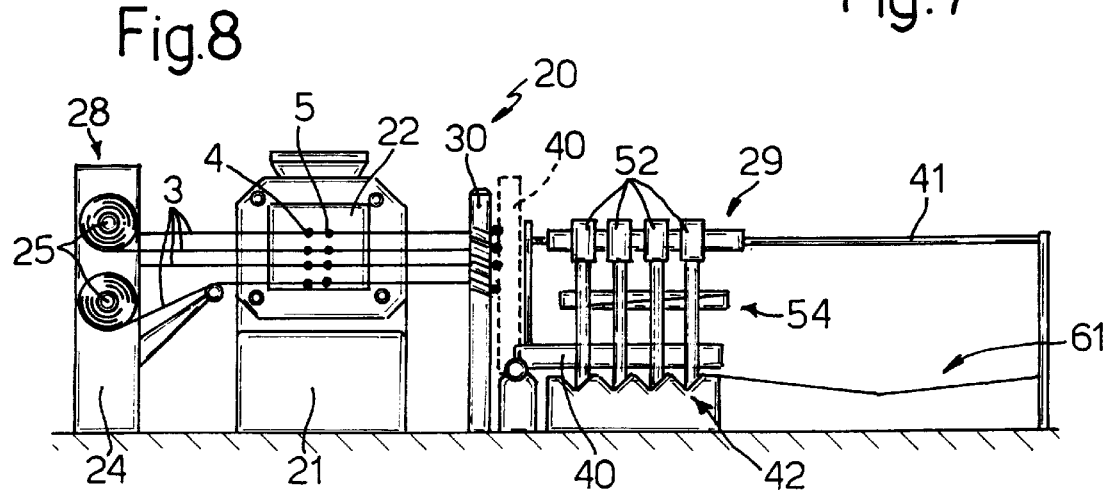

US 6,199,246 B1

INTEGRATED TIE FOR FASTENING THE UPHOLSTERY OF A VEHICLE SEAT CUSHION AND/OR SEATBACK, AND RELATIVE FABRICATION METHOD

FIELD OF THE INVENTION

The present invention relates to an integrated tie for fastening the upholstery of a vehicle seat cushion and/or seatback, and to a method of fabricating such an integrated tie.

BACKGROUND OF THE INVENTION

In upholstery, and particularly for securing upholstery to vehicle seats, ties are used which are fitted to the seat structure and which provide for holding the upholstery firmly against the seat padding on the structure. The upholstery of cushions defining the seat portion of vehicle seats is fastened using ties comprising a portion of wire of a predetermined length and fitted at opposite ends with two heads adjustably connectable to each other; the wire is inserted manually inside a tubular sleeve defined by a folded stitched edge of the upholstery material, and the two heads are connected to each other so as to tension the tie and stretch the upholstery material firmly onto the padding.

Manually inserting the wire inside the tubular sleeve defining the wire seat on the upholstery material is obviously a painstaking, time-consuming job, which also affects the health of assembly workers (that is, such operations, can result in cramps tendonitis, and the like). One solution proposed to eliminate this drawback is to use a tie integrated directly in the upholstery material, which is defined by the wire complete with the two heads, and which is stitched directly to the edge of the cushion and/or seatback upholstery material by a special stitching process enabling subsequent tensioning of the tie. However, besides being extremely expensive, such a solution also involves the use of bulky special-purpose equipment.

OBJECTS OF THE INVENTION

It is an object of the present invention to overcome the aforementioned drawbacks by providing an integrated tie for fastening upholstery to vehicle seat cushions, which is quick and easy to assemble and involves no special-purpose equipment or tiring manual work. It is a further object of the present invention to provide a method of fabricating such a tie, which may be implemented cheaply and rapidly, in particular, automatically in one stamping cycle, using relatively straightforward, compact equipment.

SUMMARY OF THE INVENTION

According to the present invention, there is provided an integrated tie for fastening the upholstery of a vehicle seat cushion and/or seatback, of the type comprising a portion of wire, of predetermined length, fitted integrally at opposite ends with respective mutually connectable heads; characterized by also comprising a portion of tape shorter than the portion of wire and folded longitudinally about the portion of wire, between the heads, so as to enclose the portion of wire inside a tubular sleeve defined by a U-folded intermediate longitudinal portion of the portion of tape and closed by a flat connecting strip defined by superimposed mutually fixed opposite longitudinal lateral portions of the portion of tape; the connecting strip being stitchable to the upholstery in a conventional manner.

According to the present invention, there is also provided a method of fabricating an integrated tie for fastening the upholstery of a vehicle seat cushion and/or seatback, comprising the steps of:

molding onto a first portion of wire, maintained taut between respective half-molds of an injection press, a pair of mutually connectable heads adjacent to and oriented head-to-tail with respect to each other;

drawing the wire to unwind, between the half-molds, a second portion of wire from a reel; and cutting the wire between the adjacent heads, while a first head is gripped so as to maintain the second portion of wire taut, so as to separate the first portion of wire from the second portion of wire;

characterized by also comprising the steps of:

gripping a second head by means of a supporting device for maintaining the first portion of wire taut and rotating the first portion of wire onto a precut portion of tape parallel to an assembly surface;

raising the edges of the portion of tape with respect to the assembly surface so as to fold an intermediate longitudinal portion of the portion of tape into a U about the wire and so form a tubular sleeve housing the wire and closed by a flat connecting strip defined by opposite longitudinal lateral portions, adjacent to the edges, of the portion of tape; and securing the edges to each other by lap welding the lateral portions.

The wire of the tie is thus enclosed inside the tape with no stitching required, and is free to slide inside the tubular sleeve defined by the tape. By virtue of the lap welded lateral portions, the tape may then be stitched directly to the edge of the upholstery in the usual way, and therefore cheaply, quickly and with no need for special machinery. In actual use, the upholstery is fitted to the cushion and/or seatback, and the fitter simply pulls the ends of the tie fitted with the two heads, after first connecting the heads hanging outside the tape, to tension the tie and fasten the upholstery effortlessly and/or with no movements or operations capable of causing physical discomfort, such as cramps or tendonitis.

BRIEF DESCRIPTION OF THE DRAWINGS

A non-limiting embodiment of the present invention will be hereinafter described by way of example with reference to the accompanying drawings, in which like reference characters designate like or corresponding parts throughout the several views, and wherein:

FIG. 1 is a side view of the integrated tie according to the invention;

FIG. 2 is a larger-scale cross section of the FIG. 1 tie;

FIGS. 3, 4 and 8 are respectively a schematic top plan view, a schematic three-quarter front view in perspective, and a schematic side view of a device for fabricating the FIG. 1 and 2 tie;

FIGS. 5, 6 and 7 are respectively a larger-scale view in perspective, a larger-scale side view, and a larger-scale cross section of details of the FIG. 3, 4 and 8 device at different steps in the method according to the invention.

DETAILED DESCRIPTION OF THE INVENTION

Figure 5:
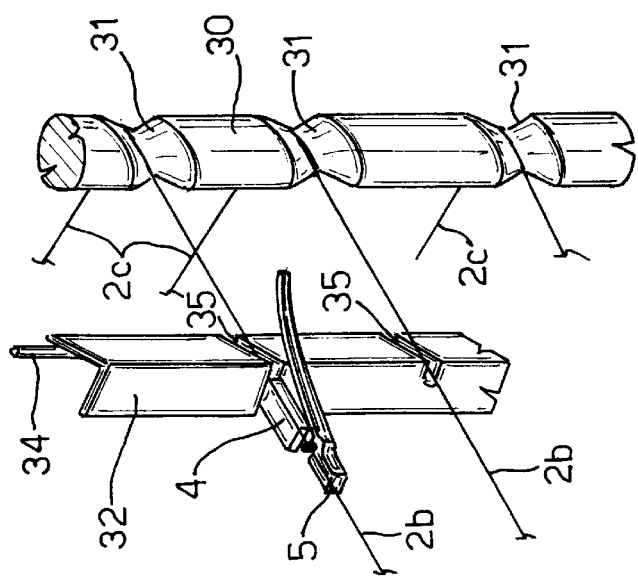
Figure 4:
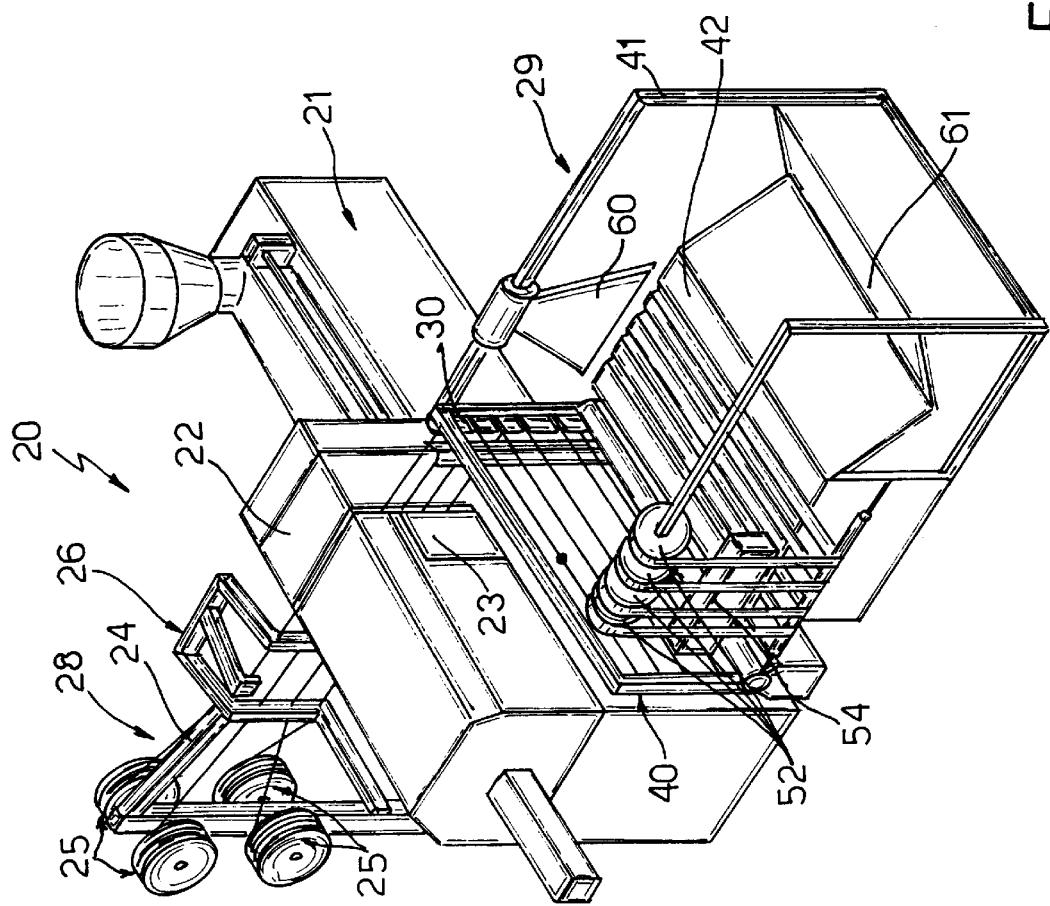

Number 1 in FIGS. 1 and 2 indicates as a whole an integrated tie for fastening known upholstery, not shown, to a known vehicle seat cushion and/or seatback, not shown.

Tie 1 comprises a portion 2 of predetermined length of a wire 3, for example, defined by a strand of synthetic fibers, fitted integrally at opposite ends with respective known end heads 4, 5, which snap onto each other in a sliding and adjustable manner so as to both tension and removably connect the opposite ends of wire portion 2.

According to the invention, tie 1 also comprises a portion 6 of a flat tape 7 of woven or nonwoven synthetic fabric. Tape portion 6 is shorter than wire portion 2, and is folded longitudinally about wire portion 2, between heads 4 and 5, which therefore project from or are disposed externally of opposite ends of tape portion 6, so that wire portion 2 is enclosed by tape 7 inside a tubular sleeve 8 defined by an intermediate longitudinal portion 9 of tape portion 6, which portion 6 is folded into a U about wire 3 and is closed to form sleeve 8 by a flat strip 10 defined by superimposed mutually fixed opposite longitudinal lateral portions 11, 12 of tape portion 6 as seen in FIG. 2. Besides longitudinally sealing tubular sleeve 8, strip 10 also defines a connecting element for fastening tie 1 to the upholstery, not shown. According to the invention, in fact, strip 10 is so formed as to be stitchable in a conventional manner, that is, with no special stitching or machinery required, along the edge of the upholstery to which tie 1 is to be fitted.

Portions 11, 12 may be fixed one on top of the other in any manner, such as, for example, by stitching, providing it does not interfere with the stitching of strip 10 to the upholstery. As tape 7 is made of synthetic material, however, portions 11, 12, according to the invention, are preferably lap welded using any known fast welding method, such as, for example, hot blade and/or ultrasonic, to form a continuous weld bead 13 or a discontinuous, for example stitch or spot, weld.

With reference to FIGS. 3, 4, 6, 7 and 8, tie 1 as described is fabricated easily and cheaply using a method employing a device 20, shown schematically, which substantially comprises a known horizontal injection press 21 fitted with a pair of facing half-molds 22, 23 movable with respect to each other so as to mold the heads 4, 5 of each tie 1 adjacent to each other and oriented head-to-tail as shown in FIG. 5, and as shown schematically by pairs of dots in FIGS. 3 and 8. Device 20 also comprises a pair of fixtures 28, 29.

Together with part of fixture 29, fixture 28 provides, as will be seen, for molding heads 4, 5 onto wire 3, and substantially comprises a support 24 for a plurality, four in the example shown, of idle reels 25 of wire 3, from which four straight portions 2a of wire 3 are unwound and held taut between half-molds 22, 23 of press 21. Wires 3 are tensioned by a known wire take-up device 26, as seen in, FIG. 4 and by a transmission rod 30 forming part of fixture 29.

According to one aspect of the invention, wires 3 are wound 90° about rod 30—which is provided with helical grooves 31, as seen in, FIG. 5 for smooth cornering—and form four straight portions 2b of wire 3 substantially at right angles to portions 2a and substantially parallel to the axis of, and extending along one side of, press 21. As shown in FIG. 5 and schematically in FIG. 3 for the sake of simplicity, provision is made, parallel to rod 30, for a movable stop bar 32 defined, for example, by an L-section rotating about a pin 34 and having slots 35. Slots 35 are engaged by portions 2c of wire 3, which connect portions 2a to portions 2b, and which, after winding 90° about rod 30, terminate with respective heads 4 resting against bar 32 beyond slots 35. Heads 4 are connected head-to-tail to corresponding heads 5 of portions 2b, which are held taut by a frame device 40 forming part of fixture 29, together with a supporting structure 41 and an assembly table or surface 42.

More specifically, device 40, shown schematically for the sake of simplicity, comprises a first gripping device 43, as seen in, FIG. 3 having cutting means, for example, shears, and which provides for gripping the end of portions 2b fitted with head 5, and for simultaneously cutting the connection between adjacent heads 4 and 5 as shown in FIG. 5. Device 40 also comprises a second gripping device 44, which is movable, parallel to portions 2b and by a distance equal to the desired length of wire portions 2, between a gripping position shown schematically by the dash line in FIG. 3, and a limit position shown by the continuous line in FIG. 3. Finally, the whole of frame device 40, together with devices 43, 44, swings about an axis A parallel to wire portions 2b, so as to move, together with wire portions 2b held taut by the frame device, from the position shown by the dash line in FIG. 8, to the work position shown by the continuous line in FIG. 8, and in which portions 2b rest on assembly surface 42.

With reference to FIGS. 6 and 7, assembly surface 42 comprises a plurality of V-shaped seats 45—one for each wire 3—each defined, in the non-limiting example shown, by two symmetrical plates 46, which rotate book-fashion about an articulated joint 47 located substantially at the apex of the V, and each of which comprises a recess 48 at articulated joint 47. At a predetermined distance from articulated joint 47, each plate 46 is also fitted with a known ultrasonic or hot-blade welding device 50.

Over and to the side of table or surface 42, structure 41 supports a series of four reels 52, one for each wire 3, of synthetic tape 7; and a device 54 for unwinding and precutting from reels 52 respective portions 6 of the tape 7, which are precut to the desired length, are deposited by device 54 on the bottom of seats 45, and are retained flat inside the seats 45 by a device 60, which travels back and forth, along structure 41, between table 42 and an unloading station 61 for the finished ties 1.

After preparing portions 2a and 2c of wires 3 by unwinding them manually from reels 25, and after molding onto the portions 2a and 2c of the wires a number of pairs of heads 4, 5 in the head-to-tail position shown in FIG. 5, with the first pair engaging bar 32 as shown in FIG. 5, device 20 is ready to operate automatically as follows.

Firstly, device 40 is activated: device 44, in the dash-line position in FIG. 3, grips heads 4 of portions 2c and moves toward the continuous-line position so as to unwind wire portions 2a from reels 25 when half-molds 22, 23 are open; and wires 3, formerly defining portions 2a and carrying respective pairs of heads 4, 5, are wound about rod 30 so as to define further portions 2c, while the previous portions 2c are tensioned by rod 30 so as to define the first series of portions 2b.

At this point, while half-molds 22, 23 close to mold another pair of heads 4, 5 onto each portion 2a of wire 3, devices 43 grip and cut or separate heads 5 of portions 2c from respective heads 4, which remain against bar 32; frame device 40 begins rotating towards surface 42; at the same time, tapes 7 are unwound from reels 52, and portions 6 are precut from the tapes and deposited by device 54 inside seats 45; and frame device 40 finally completes its movement so as to deposit portions 2b of wires 3 on top of portions 6 of tape 7 inside seats 45.

At this point, the longitudinal portions or edges 15, 16, as seen in, FIG. 2 of each portion 6 of tape 7 are raised to form U-folded portion 9 by rotating plates 46 towards and into contact with each other as seen in FIG. 7. The U-folded portions 9 and portions 2b of wire 3 are therefore housed inside tubular cavities defined by facing recesses 48 of the two adjacent plates 46, while lateral portions 12, 13 of portions 6 of tape 7 are superimposed on plates 46 at devices 50, which are then activated to form weld bead 13.

Plates 46 are then restored to the starting position, and the finished ties 1 lying inside seats 45 are picked up by device 60 and deposited at station 61. At the same time, half-molds 22, 23 are opened, and device 40 is activated to move back into the vertical position, grip heads 4 on bar 32, and perform a further feed cycle of wires 3. The above operations are then repeated cyclically to produce, at each cycle, four ties 1, which are deposited at station 61.

The same operations and steps may of course be performed using devices other than that described, which is only a non-limiting embodiment of the present invention. Many variations and modifications are possible in light of the above teachings. It is thus to be understood that within the scope of the appended claims, the present invention may be practiced otherwise than as specifically described herein.

What is claimed is:

1. An integrated tie for fastening the upholstery of seat cushions and seat backs, comprising:

an elongated member having a predetermined length and first and second connectors, for connection to each other, disposed upon opposite ends of said elongated member; and a material member having a predetermined length which is less than said predetermined length of said elongated member such that opposite ends of said material member are disposed between said first and second connectors of said elongated member when said material member is disposed upon said elongated member, said material member having opposite laterally disposed, longitudinally extending edge portions folded transversely about said elongated member so as to define a longitudinally extending tubular sleeve which encloses a portion of said elongated member disposed between said first and second connectors of said elongated member, and wherein said laterally disposed, longitudinally extending edge portions of said material member are superimposed upon each other and fixed together so as to close said tubular sleeve and define a connecting strip projecting laterally from one side portion of said closed tubular sleeve by means of which said integrated tie can be secured to the upholstery.

2. The integrated tie as set forth in claim 1, wherein:
said material member comprises a tape fabricated from a synthetic material.

3. The integrated tie as set forth in claim 2, wherein:
said means for fixing said longitudinally extending edge portions of said material member together comprises welded regions of said longitudinally extending edge portions of said material member.

4. The integrated tie as set forth in claim 3, wherein:
said welded regions are continuous.

5. The integrated tie as set forth in claim 3, wherein:
said welded regions comprise spot welds.

6. The integrated tie as set forth in claim 1, wherein:
said first and second connectors of said elongated member comprise snap-fitting connectors which snap-fittingly engage each other.

7. The integrated tie as set forth in claim 1, wherein:
said elongated member comprises a wire member.

8. The integrated tie as set forth in claim 7, wherein:
said wire member comprises a strand of synthetic fibers.

9. A method of fabricating an integrated tie for fastening upholstery of seat cushions and seat backs, comprising the steps of:

providing first and second connectors upon opposite ends of an elongated member having a predetermined length, wherein said first and second connectors are adapted to be connected to each other;

disposing said elongated member, with said first and second connectors disposed thereon, upon a substantially central portion of a material member having a predetermined length which is less than said predetermined length of said elongated member, and having laterally spaced, longitudinally extending edge portions;

transversely folding said material member at said substantially central portion thereof by bringing said laterally spaced, longitudinally extending edge portions together in a superimposed manner such that said material member is formed into a tubular sleeve disposed about said elongated member; and securing together said superimposed, laterally spaced, longitudinally extending edge portions of said material member so as to close said tubular sleeve and define a connecting strip projecting laterally from one side portion of said closed tubular sleeve by means of which said integrated tie can be secured to the upholstery.

10. The method as set forth in claim 9, wherein:
said method of fabricating said integrated tie comprises a continuous method whereby a plurality of integrated tie members can be serially manufactured from a single elongated member.

11. The method as set forth in claim 10, wherein:
said method of manufacturing said plurality of integrated ties members comprises attaching said first and second connectors to one portion of said single elongated member while another portion of said single elongated member, separated from said one portion of said single elongated member, is being enveloped within said folded tubular sleeve comprising said material member.

12. The method as set forth in claim 11, further comprising the steps of:

providing said single elongated member as a continuous single elongated member disposed upon a supply reel;

withdrawing a first portion of said single elongated member from said supply reel;

attaching a first pair of said first and second connectors upon said first portion of said single elongated member such that said first pair of said first and second connectors are disposed adjacent to each other at relatively downstream and upstream positions, respectively, as considered in the direction of withdrawal of said single elongated member from said supply reel of said single elongated member;

withdrawing a second portion of said single elongated member from said supply reel of said single elongated member by moving said first portion of said single elongated member, having said first pair of said first and second connectors disposed thereon, to a first downstream position, and attaching a second pair of first and second connectors, disposed adjacent to each other and at relatively downstream and upstream positions, to said second portion of said single elongated member;

gripping said first portion of said single elongated member at a position upstream of said second upstream connector of said first pair of first and second connectors and moving said first portion of said single elongated member from said first downstream position to a second downstream position located downstream from said first downstream position so as to withdraw a third portion of said single elongated member from said supply reel of said single elongated member, and attaching a third pair of said first and second connectors to said third portion of said single elongated member; and cutting said single elongated member at a position between said second pair of said first and second connectors so as to separate said first portion of said single elongated member from said second and third portions of said single elongated member and wherein said second upstream connector of said first pair of first and second connectors, and said first downstream connector of said second pair of first and second connectors comprise first and second connectors disposed upon opposite ends of each one of the separated portions of said single elongated member, whereby said separated first portion of said single elongated member can be enveloped within said tubular sleeve material member.

13. The method as set forth in claim 10, wherein:

said first and second connectors are molded upon said elongated member.

14. Apparatus for forming an integrated tie for fastening upholstery to seat cushions and seat backs, comprising:

means for attaching first and second connectors, adapted to be connected together, to opposite ends of an elongated member having a predetermined length;

means for transversely folding a material member, having a predetermined length which is less than said predetermined length of said elongated member, and opposite laterally disposed, longitudinally extending edge portions, about said elongated member so as to define a longitudinally extending tubular sleeve, having said longitudinally extending edge portions superimposed upon each other, which encloses a portion of said elongated member disposed between said first and second connectors of said elongated member; and means for fixing said superimposed, longitudinally extending edge portions of said material member together so as to close said tubular sleeve and define a connecting strip projecting laterally from one side portion of said closed tubular sleeve by means of which said integrated tie can be secured to the upholstery.

15. Apparatus as set forth in claim 14, wherein:

said means for attaching said first and second connectors to said opposite ends of said elongated member comprise matable mold halves for molding said first and second connectors upon said elongated member.

16. Apparatus as set forth in claim 14, wherein said means for transversely folding said material member comprises:

a support surface; and a pair of plate members hingedly mounted about a common hinge axis upon said support surface.

17. Apparatus as set forth in claim 16, wherein said means for fixing said edge portions of said material member together comprises:

welding means incorporated within each one of said pair of plate members for welding said edge portions of said material member together.

18. Apparatus as set forth in claim 16, wherein:

each one of said pair of plate members comprises a recessed portion for housing a folded portion of said material member such that said folded portion of said material member forms said tubular sleeve through which said elongated member can move freely.

19. Apparatus as set forth in claim 16, further comprising:

reel means for providing a supply of said material member; and means for conveying said material member of said predetermined length to said support surface so as to be able to receive said elongated member about which said material member is to be folded.

20. Apparatus as set forth in claim 16, further comprising:

matable mold halves for molding said first and second connectors upon said elongated member; and pivotal gripping means for receiving said elongated member from said matable mold halves and depositing said elongated member, with said first and second connectors fixed upon said elongated member, upon said support surface.

* * * * *